United States Patent [19]
Wiesboeck et al.

[11] 3,875,292
[45] Apr. 1, 1975

[54] PREPARATION OF ARSENIC PENTAFLUORIDE AND FLUOROARSENIC ACIDS

[75] Inventors: Robert A. Wiesboeck, Stone Mountain; John D. Nickerson, Atlanta, both of Ga.

[73] Assignee: United States Steel Corporation, Pittsburgh, Pa.

[22] Filed: July 30, 1973

[21] Appl. No.: 383,750

Related U.S. Application Data

[60] Continuation-in-part of Ser. No. 848,119, Aug. 6, 1969, abandoned, which is a continuation-in-part of Ser. No. 702,547, Feb. 2, 1968, abandoned, which is a division of Ser. No. 127,827, March 24, 1971.

[52] U.S. Cl.................... 423/472, 423/87, 423/88, 423/481
[51] Int. Cl...... C01b 27/00, C01b 7/00, C01b 9/08
[58] Field of Search ............... 423/489, 87, 88, 472

[56] References Cited
OTHER PUBLICATIONS
Muetterties et al., Article, Vol. 80, 1958, pp. 5914–5918.

Primary Examiner—Edward Stern
Attorney, Agent, or Firm—John R. Pegan

[57] ABSTRACT

Phosphorus pentafluoride and fluorophosphoric acids are prepared from a fluorine source selected from fluorosulfonate fluorides and mixtures of fluorides and fluorosulfonates and a phosphorus source selected from phosphoric acid and mono- or difluorophosphoric acid. By an analogous process, arsenic pentafluoride and fluoroarsenic acids are prepared by fluorinating an arsenic source selected from arsenic acid and monofluoroarsenic acid.

12 Claims, No Drawings

PREPARATION OF ARSENIC PENTAFLUORIDE AND FLUOROARSENIC ACIDS

This application is a continuation-in-part of our co-pending application Ser. No. 848,119, filed Aug. 6, 1969 and now abandoned, which in turn is a continuation-in-part of our co-pending application Ser. No. 702,547, filed Feb. 2, 1968 and now abandoned.

This is a division of application Ser. No. 127,827, filed Mar. 24, 1971.

BACKGROUND OF THE INVENTION

Conventional processes for the manufacture of phosphorus pentafluoride are based on the halogen exchange of phosphorus pentachloride with arsenic trifluoride, $$3PCl_5 + 5AsF_3 \rightarrow 3PF_5 + 5AsCl_3$$

or on the chlorofluorination of phosphorus trifluoride, $$5PF_3 + Cl_2 \rightarrow 3PF_5 + 2PCl_3$$

Both methods require extensive fractionation to separate mixed halides ($PClF_4$, $PCl_2F_3$, etc.) from phosphorus pentafluoride.

Fluorophosphoric acids, on the other hand, are produced from phosphorus pentoxide and hydrogen fluoride at the appropriate molar ratios:

$$P_2O_5 + 3HF \rightarrow H_2PO_3F + HPO_2F_2$$

$$P_2O_5 + 12HF \rightarrow 2HPF_6 + 10H_2O$$

Conventional procedures for the manufacture of arsenic pentafluoride, $AsF_5$, involve the fluorination of arsenic, As, or arsenic trifluoride, $AsF_3$, with elemental fluorine, $F_2$.

$$2As + 5F_2 \rightarrow 2AsF_5$$

$$AsF + F_2 \rightarrow AsF_5$$

Hexafluoroarsenic acid, $HAsF_6$, is produced by reacting arsenic pentoxide, $As_2O_5$, with anhydrous hydrogen fluoride, HF.

$$As_2O_5 + 12HF \rightarrow 2HAsF_6 + 5H_2O$$

SUMMARY OF THE INVENTION

We have discovered that phosphorus and arsenic pentafluoride and fluorine substituted phosphoric and arsenic acids can be prepared in a simple one-step operation from inexpensive raw materials by heating a phosphorus or arsenic source with a fluorosulfonate fluoride or a mixture of a fluorosulfonate and a fluoride. The fluorine-containing products are volatilized on heating to above 120°C. The fluorophosphoric or fluoroarsenic acids produced are condensed by cooling the off-gas. The remaining gas is essentially phosphorus or arsenic pentafluoride. By variations in the process conditions, it is possible to obtain either the acid or the pentafluoride as the sole product.

DETAILED DESCRIPTION

The reaction begins upon heating a phosphorus or arsenic source and a fluorine source to above 120°C. The phosphorus or arsenic source may be phosphoric or arsenic acid or the fluorinated derivatives of these acids. The acids are preferably as pure as possible, but the reaction will occur satisfactorily using wet process phosphoric acid as well as furnace acid. Above concentration levels of 72% $P_2O_5$ or 100% $H_3AsO_4$ increasing the acid concentration does not affect the product distribution. Below these levels, a decrease in acid concentration is accompanied by a shift in product distribution from the pentafluoride to the acid. Best results are obtained using a phosphorus source having a $P_2O_5$ concentration of about 65 – 82 percent or an arsenic source having a $H_3AsO_4$ concentration of about 75 – 115 percent.

The fluorine source is a fluorosulfonate fluoride or a mixture of a fluorosulfonate and a fluoride. Any alkaline earth fluorosulfonate fluoride may be used. Calcium fluorosulfonate fluoride is preferred and may be prepared by sulfonation of calcium fluoride with dilute sulfur trioxide such as the converter gas from a sulfuric acid plant, at atmospheric pressure and 150 – 350°C. Pulverized fluorospar can also be used as the calcium fluoride source. In this case 100 percent sulfur trioxide at 50 – 200 psi pressure and 150 – 350°C is necessary to compensate for the lower reactivity of the mineral.

A mixture of a fluorosulfonate and a fluoride may be used in place of the fluorosulfonate fluoride. The cation of the fluorosulfonate and of the fluoride may be any of the alkali or alkaline earth metals. It is not necessary that the same cation be used for the fluoride and for the fluorosulfonate. Thus, examples of suitable mixtures would be $NaF + NaFSO_3$, $NaF + Ca(FSO_3)_2$, $KF + NaFSO_3$, $CaF_2 + KFSO_3$, $CaF_2 + Ba(FSO_3)_2$, $CaF_2 + Ca(FSO_3)_2$, etc. We prefer to use approximately equimolar amounts of fluoride and fluorosulfonate, however, the proportions may be varied widely without negative effect.

The molar ratio of phosphorus or arsenic source to fluorine source may vary from 1:2 to 1:8. At ratios of 1:2 to 1:4, the product is predominantly the acid. At ratios of 1:4 to 1:5 substantial amounts of both acid and pentafluoride appear as product and at ratios of 1:5 to 1:8 the pentafluoride predominates. These ratios apply to a batch process where the phosphorus or arsenic source is premixed with the fluorine source and then heated. In a continuous process the phosphorus or arsenic source is introduced to a reactor containing a heated stirred bed of the fluorine source. Conditions are such in a continuous process of this type that substantial amounts of both products are obtained at all concentrations of about 1:2 to 1:8. Most efficient utilization of raw materials occurs at ratios of about 1:4 to 1:6.

The reaction begins at about 120°C. We prefer to run the reaction at between 180 – 220°C using a phosphorus source or between 230 – 270°C using an arsenic source, but in no event, should the temperature be above 350°C or reactant decomposition will occur. The generalized reactions can be expressed by:

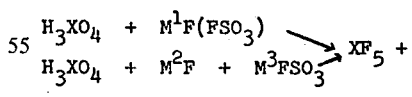

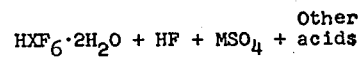

where X is phosphorus or arsenic, $M^1$ is an alkaline earth metal, preferably calcium, and $M^2$ and $M^3$ are alkali or alkaline earth metals, preferably calcium, sodium or potassium. $M^2$ and $M^3$ may be identical cations.

The volatilized fluorine containing products are collected and cooled to about 0 – 40°C to condense the acids and the remaining gas is passed to suitable storage facilities.

As stated above, product distribution may be changed by varying the concentration of the feed acid or the ratio of reactants. Product distribution may also be changed by injecting water into the reactor off-gas. The addition of approximately 2 moles of water per mole of phosphorus or arsenic source will produce acid product exclusively. A similar result may be obtained by passing the off-gas into a cool (less than 40°C) dilute pool of the desired acid. In the case of $HAsF_6$ the pool acid concentration should be kept below 85 percent $HAsF_6$, preferably about 75 percent, by adding $H_2O$; in the case of $HPF_6$ the pool acid concentration should be kept below 80 percent, preferably below 75 percent $HPF_6$. It is also possible to produce and recover phosphorus pentafluoride as the sole product. In this embodiment of our invention the volatilized fluorine-containing products are collected and the pentafluoride recovered as product. The acids produced are recycled to the fluorination process after blending with polyphosphoric acid or phosphorus pentoxide. The proportions of hexafluorophosphoric acid to the poly acid or pentoxide should be such to give a molar fluorine/phosphorus ratio of 1.5 to 2.5, preferably 2.0. The polyphosphoric acid should have a $P_2O_5$ equivalent of from about 70 to 90 percent, preferably from about 82 to 84 percent $P_2O_5$.

The reaction of polyphosphoric acid and hexafluorophosphoric acid is moderately exothermic. The reaction temperature should be prevented from rising above about 80°C. The reaction is preferably run at a temperature in the range of about 40° to 60°C. The resulting liquid is then recycled to the fluorination step.

The following examples show specific embodiments of our invention and, as such, are not intended to be limiting.

EXAMPLE I

Calcium fluoride (45.0 g) was placed in a vertical 1 − x 20-in. glass tube equipped with a fritted disk to hold the charge. The entire tube was heated to 250°C while dry air was introduced at the bottom of the tube to achieve fluidization. After heating for 1 hour to assure dryness of the charge, hot sulfur trioxide gas was blended into the air sweep to maintain a 10 percent (vol.) $SO_3$ concentration. The absorption of sulfur trioxide was quantitative during the first 2 hours. Thereafter, part of the $SO_3$ began to pass through the reactor. The reaction was continued until 46.0 g $SO_3$ had been absorbed which required an additional hour. The dry air sweep was maintained for another hour to remove all physically-absorbed $SO_3$. The final product contained 0.98 moles $SO_3$ per mole of $CaF_2$. The material was moderately hygroscopic and had to be stored in a dry atmosphere to avoid hydrolysis.

EXAMPLE II

To 0.300 mole of calcium fluorosulfonate fluoride (47.5 g), prepared according to Example I above, was added 0.100 mole (9.8 g) of 72.4% $P_2O_5$ phosphoric acid. The mixture was blended thoroughly in a mortar while excluding moisture. After transfer to an aluminum cylinder and evacuation, the reaction was started by heating to 200°C. Completion of the reaction was achieved within one hour as indicated by constant pressure. The volatile reaction product was allowed to expand from the hot reactor into an evacuated cold (−196°C) cylinder. A total of 15.8 g was collected and fractionated at −40°C into 5.8 g phosphorus pentafluoride and 9.5 g hexafluorophosphoric acid. The actual $HPF_6$ concentration in the liquid was 73.1 percent, determined as nitron hexafluorophosphate.

EXAMPLE III

The reaction between 0.200 mole calcium fluorosulfonate fluoride (31.6 g) and 0.100 mole 72.4% $P_2O_5$ phosphoric acid (9.8 g) produced, after treatment according to Example II, 12.2 g of a mixture of equal parts difluoro- and hexafluorophosphoric acids. The amount of phosphorus pentafluoride was less than 1.0g.

EXAMPLES IV – VIII

| Example | Phosphorus Source | Fluorine Source | Products | | |
|---|---|---|---|---|---|
| | | Procedure as in Example II | | | |
| IV | $H_3PO_4(82\% P_2O_5)$ 0.1 mole, 8.6 g | $CaF(FSO_3)$ 0.3 mole, 47.5 g | $PF_5$ 4.6 g | $HPF_6 \cdot 2H_2O$ 8.3 g | |
| V | $H_3PO_4(72.4\% P_2O_5)$ 0.1 mole, 9.8 g | $CaF(FSO_3)$ 0.2 mole, 31.6 g | $PF_5$ less than 1.0 g | $HPF_6 \cdot 2H_2O$ 6.1 g | $HPO_2F_2$ 6.1 g |
| VI | $H_3PO_4(72.4\% P_2O_5)$ 0.1 mole, 9.8 g | $CaF + Ca(FSO_3)_2$ 0.15 mole 0.15 mole 11.7 g 35.6 g | $PF_5$ 5.3 g | $HPF_6 \cdot 2H_2O$ 9.4 g | |
| VII | $H_3PO_4(72.4\% P_2O_5)$ 6.4 g | $BaF (FSO_3)$ 51.0 g | $PF_5$ 3.6 g | $HPF_6 \cdot 2H_2O$ 5.6 g | |
| VIII | $H_2PO_3F$ 10 g | $CaF(FSO_3)$ 10 g | $PF_5$ 4.6 g | $HPF_6 \cdot 2H_2O$ 8.1 g | |

EXAMPLE IX

Calcium fluorosulfonate fluoride (48.6 g) and 100 percent $H_3AsO_4$ (14.2 g) were mixed thoroughly in a mortar and placed in an aluminum cylinder. After evacuation, the reactor was heated to 250°C. A pressure of 200 psi developed. Volatile material was allowed to expand through a Teflon tube (½ × 12 in.) maintained at 100°C into a cylinder cooled with ice. The remaining gaseous material was condensed in another cylinder maintained at −196°C.

After completion of the run, the Teflon tube contained 3.6 g of solid hexafluoroarsenic acid monohydrate. The first cylinder (0°C) contained 5.2 g of liquid hexafluoroarsenic acid (88% $HAsF_6$) and the second cylinder (−196°C) 6.7 g of arsenic pentafluoride.

EXAMPLE X

An equimolar mixture of potassium fluoride (29.2 g) and potassium fluorosulfonate (69.0 g) was heated to 150° in an aluminum reactor while stirring.

Arsenic acid was injected as an 85% $H_3AsO_4$ solution in water (59.1 g). The temperature was increased to 250°C over a 3-hour period and the volatile material passed into liquid hexafluoroarsenic acid from a previous run. The temperature of the stirred acid pool was kept at 0°C by external cooling. Water was added periodically to keep the hexafluoroarsenic acid concentration below 80 percent. A total of 48.2 g of hexafluoroarsenic acid on a 100 percent basis was obtained.

EXAMPLE XI

Technical grade arsenic acid (47.0 g) containing 75 percent $H_3AsO_4$ was concentrated by evaporation to 100 percent $H_3AsO_4$ and injected gradually into a stirred bed of barium fluorosulfonate fluoride (210.0 g) while heating to maintain 250°C. The volatile reaction product was passed into a stirred pool of 41 percent $HAsF_6$ which was cooled by an ice bath. Residual gaseous product from the reactor was swept into the receiving vessel by a stream of dry air. At the end of the operation, the hexafluoroarsenic acid concentration in the pool had increased to 85 percent. This corresponded to a 75 percent conversion of the employed arsenic acid to hexafluoroarsenic acid.

EXAMPLE XII

Twelve kg. of hexafluorophosphoric acid containing 70–75% $HPF_6$ were placed in a polyethylene-lined reactor and stirred rapidly. A total of 9.5 kg. of phosphorus pentoxide was added gradually over a 3-hour period while cooling to maintain the temperature below 50°C. The resulting liquid was then fluorinated by spraying it into a stirred bed of 65.0 kg. of calcium fluorosulfonate fluoride and heating to 150° – 200°C. The liberated gas was passed through a dust collector into a fractionation column at 22 psia. Maintaining the top temperature at 10°C and the bottom at 75°C produced 17.2 kg. of phosphorus pentafluoride and 12.0 kg. of hexafluorophosphoric acid (70–75% $HPF_6$).

EXAMPLE XIII

Polyphosphoric acid (11.4 kg.) containing 82–84 percent $P_2O_5$ was added slowly to 12.0 kg. of hexafluorophosphoric acid in a polyethylene-lined vessel while stirring rapidly. The temperature increased from 25° to 62°C. No cooling was applied. The resulting liquid produced, on fluorination with 65.0 kg. of calcium fluorosulfonate fluoride according to the procedure outlined in Example XII, a total of 14.0 kg. of phosphorus pentafluoride and 18.1 kg. of hexafluorophosphonic acid.

We claim:

1. A process for the preparation of $AsF_5$ and $HAsF_6$ which comprises, at temperatures in the range of 120°–350°C, reacting a fluorine source selected from the group consisting of (a) alkaline earth fluorosulfonate fluorides (b) alkali metal fluorosulfonate-fluoride mixtures (c) mixtures of (a) and (b), and (d) mixtures of alkali metal or alkaline earth fluorides with alkaline earth fluorosulfonates, with a source of arsenic selected from the group consisting of arsenic acids and fluorinated derivatives thereof, and recovering evolved gases containing said $AsF_5$ and said $HAsF_6$ the molar reactant ratio of said arsenic source to said fluorine source being in the ratio of about 1:2 to about 1:8.

2. The process of claim 1, wherein said molar reactant ratio is within the range of about 1:4 to about 1:6 and said reactant temperature is within the range of about 230°–270°C.

3. The process of claim 1, wherein said fluorine source is calcium fluorosulfonate fluoride.

4. The process of claim 2, wherein said fluorine source is calcium fluorosulfonate fluoride.

5. The process of claim 3, wherein said process is a batch process and the proportion of $HAsF_6$ in said evolved gases is increased by employing a molar reactant ratio of about 1:2 to 1:4.

6. The process of claim 3, wherein the proportion of $HAsF_6$ derived from said evolved gases is increased by employing an arsenic source with a concentration of less than 100 percent $H_3AsO_4$, said proportion of $HAsF_6$ increasing as the $H_3AsO_4$ concentration is decreased.

7. The process of claim 1, wherein the $AsF_5$ in the evolved gases is hydrolyzed by contact with at least about 2 moles of water per mole of As in said gases, so as to recover substantially only $HAsF_6$.

8. The process of claim 7, wherein said hydrolyzation is accomplished by passing said evolved gases into a cool aqueous pool, containing $HAsF_6$ in a concentration below about 85 percent.

9. The process of claim 8, wherein the $HAsF_6$ concentration of said pool is about 75 percent.

10. The process of claim 1, wherein said arsenic source has a concentration of about 75–115 percent $H_3AsO_4$.

11. The process of claim 10, wherein the proportion of $AsF_5$ in said evolved gases is increased by employing an arsenic source with a concentration greater than about 100 percent $H_3AsO_4$.

12. The process of claim 11, wherein said process is a batch process and the proportion of $AsF_5$ in said evolved gases is increased by employing molar reactant ratios of 1:5 to 1:8.

* * * * *